United States Patent [19]
Hessbrüggen et al.

[11] Patent Number: 5,699,598
[45] Date of Patent: Dec. 23, 1997

[54] MACHINE TOOL WITH A PLURALITY OF SPINDLES

[75] Inventors: Norbert Hessbrüggen, Eschenbach; Heinz Steinbach, Ulm-Gögglingen, both of Germany

[73] Assignee: EMAG-Maschinen Vertriebs- und Service GmbH, Salach, Germany

[21] Appl. No.: 630,057

[22] Filed: Apr. 12, 1996

[30] Foreign Application Priority Data

Apr. 13, 1995 [DE] Germany ............ 195 14 058.3

[51] Int. Cl.$^6$ .............. B23B 7/04; B23Q 5/22; B23C 1/10
[52] U.S. Cl. .............. 29/27 C; 29/38 A; 82/129; 409/213
[58] Field of Search ............ 29/27 C, 27 R, 29/38 R, 38 A, 38 B, 38 C, 55, 50, 54, 39, 40, 41, 37; 82/129, 121, 124; 409/202, 212, 203, 217, 213

[56] References Cited

U.S. PATENT DOCUMENTS

| | | | |
|---|---|---|---|
| 3,730,028 | 5/1973 | Fusch | 29/37 |
| 4,165,661 | 8/1979 | Wasco, Jr. et al. | 82/129 X |
| 4,197,769 | 4/1980 | Smith et al. | 82/129 |
| 5,175,914 | 1/1993 | Mitsukuchi et al. | 29/27 C |
| 5,182,974 | 2/1993 | Cudini et al. | 82/124 |
| 5,207,134 | 5/1993 | Watatsuki | 29/55 X |
| 5,293,793 | 3/1994 | Hessβbrüggen et al. | 82/121 |

FOREIGN PATENT DOCUMENTS

| | | | |
|---|---|---|---|
| 3701504 | 7/1987 | Germany | 82/129 |
| 87 00 343 | 8/1987 | Germany | |
| 38 26 938 | 8/1988 | Germany | |
| 4310038 | 9/1994 | Germany | 82/129 |
| 0066601 | 4/1983 | Japan | 82/129 |
| 5162001 | 6/1993 | Japan | 29/38 B |
| 1456297 | 2/1989 | U.S.S.R. | 29/38 A |

*Primary Examiner*—William R. Briggs
*Attorney, Agent, or Firm*—McAulay Fisher Nissen Goldberg & Kiel, LLP

[57] ABSTRACT

The machine tool bas a combined slide which is formed of partial slides and is movable in the X direction on two linear guides by means of guide carriages. The two partial slides are supported directly relative to one another by support guides and can be moved in the X direction relative to one another in order to carry out a correcting adjustment or a feed movement. Each partial slide supports a vertical spindle which is movable in the Z direction. A joint multiple turret is associated with the vertical spindles, this multiple turret being outfitted with tools associated with the two tool spindles. The vertical spindles and the partial slides have separate driving units which can be controlled by corresponding control devices in such a way that the vertical spindles and the partial slides are displaceable jointly and synchronously or asynchronously on the one hand and are displaceable relative to one another on the other hand in order to carry out a correcting adjustment or a feed movement. Due to the relative displacement of the partial slides in the X direction and the vertical spindles in the Z direction, tolerances and deviations due to wear of the cutting edges can be compensated for so that the workpieces to be machined simultaneously have the same adjustment with respect to the tool cutting edges The relative displacement also permits a separate, varying machining of the workpieces.

13 Claims, 4 Drawing Sheets

MACHINE TOOL WITH A PLURALITY OF SPINDLES

BACKGROUND OF THE INVENTION a) Field of the Invention

The invention is directed to a machine tool with a machine base body and a plurality of spindles for the simultaneous or varying, separate machining of a plurality of workpieces.

b) Description of the Related Art

It is known to construct machine tools with a plurality of drivable spindles in which the spindle axes extend horizontally and in which a separately drivable compound slide or cross slide with a tool turret is associated with every spindle. In these machine tools, the spindles are arranged in a stationary manner and all feed movements are executed during the machining of workpieces via the respective cross slide supporting the tool turret. A special loading system is required for loading these spindles. Further, the allocation of a tool turret on a cross slide to every working spindle results in a corresponding space requirement so that these machines, in addition to many other disadvantages, require a relatively large amount of space. Other disadvantages consist in the need for a special loading system, poor chip disposal, and a costly construction of the cross slide with its guides and the controls required for the latter. Many of these disadvantages have led to the development of machine tools with motor-operated vertical spindles which work by the pick-up process and accordingly make do without an additional loading system. Further, the discharge of chips is designed in a substantially simpler manner than in horizontally extending spindles. An increase in the working capacity of machine tools having such vertical spindles could normally only be achieved by arranging a plurality of such units adjacent to one another on a machine base body, just as may be effected in the case of horizontally extending multiple spindles. However, just as in the case of the horizontal multiple spindles, this would require the arrangement of a plurality of independently movable tool holders on cross slides so that the space requirement would also be very high in this case.

OBJECT AND SUMMARY OF THE INVENTION

The primary object of the present invention is to provide a machine tool which can be employed in a flexible manner and is suitable for simultaneous or varying, separate machining of workpieces, in which the working capacity can be increased by a plurality of work spindles without increasing the space requirement in proportion to the increase in the number of spindles.

Proceeding from a machine tool of the type mentioned above, this object is met, according to the invention, in that at least two spindles which are drivable about their rotational axes and movable in their axial direction are received in partial slides which are supported directly relative to one another and can be moved jointly or relative to one another in a direction vertical to the movement direction of the spindles and which form a combined slide, and in that only the combined slide is guided by means of a guide arrangement on the machine base body.

Numerous advantages are achieved as a result of the fact that the multiple arrangement of spindles which are combined to form a unit can be moved jointly and due to the possibility of relative displacement. A considerable advantage consists in that the spindles are arranged relatively closely adjacent to one another and can nevertheless be moved jointly or independently from one another to execute a feed movement or to carry out a correcting adjustment. Further, it is possible, for instance, for two or more spindles to be associated with an individual tool carrier which is constructed as a multiple turret and can be arranged in a stationary manner due to the fact that the spindles can be moved along two axes so as to do away with the multiple arrangement of slides which can be moved along two axes for the tool holders. The joint machining of a plurality of workpieces by means of an individual stationary tool turret is made possible in that dimensional deviations between the tool cutting edges and the respective spindle axes can be corrected in that the spindles can be displaced relative to one another.

As a result of these steps, for example, it is possible to construct a two-spindle machine requiring only a little more surface space than a one-spindle machine and to substantially reduce construction cost compared with two combined individual machines. Accordingly, the work capacity of such a machine tool can be doubled compared to a one spindle machine at a slightly greater space requirement and slightly higher construction cost. This not only reduces investment costs with respect to the machine tool, but also substantially reduces the investment costs for providing the necessary surface area and buildings required for this purpose. Moreover, this reduces the transporting paths between the individual machines and the appropriate locations for storage of raw materials, finished workpieces, and tools which may be stocked away from the machines, as well as chip disposal, which decreases transportation costs and the total amount of time needed for machining the workpieces. Further, investment costs are reduced not only for the machine tools themselves, but also for the manufacturing halls and required transporting devices. As a result of the possibility of the relative displacement of the partial slides supporting the spindles, a plurality of workpieces can be machined synchronously as well as independently from one another.

A particularly advantageous construction of the invention consists in that the guide arrangement for the combined slide has two linear guides with associated guide carriages and the partial slides are supported relative to one another by means of support guides which are arranged at a distance from one another in the vertical direction. In this construction, a unit formed of two or more spindles has only two linear guides such as are required for guiding a slide supporting an individual spindle, wherein the relative displacement of the individual partial slides is enabled by the support guides which are provided between the partial slides. The guide arrangement for the combined slide thus comprises two linear guides which are associated in each instance with the remote outer sides of the combined slide and guide carriages which are arranged at the combined slide and associated with the linear guides.

In another construction of the invention, the support guides can comprise two linear guides and the guide carriages associated therewith.

A separate driving unit is advantageously associated with each partial slide, these separate driving units being controllable jointly and synchronously or independently from one another via a control unit.

The relative displacement of the partial slides for corrective adjustment is effected as a function of the dimensional deviation between the spindle axes and the associated tool cutting edges as determined by a measurement system.

The advantages of the divided and simple manner of construction can be achieved in particular when the spindles are constructed as motor spindles in which the rotor is arranged directly on the spindle shaft and the stator is arranged in the spindle housing and each spindle has its own drive for movement in the direction of its axis, wherein a control device is provided which enables a joint synchronous movement of both spindles or a relative displacement for carrying out a correcting adjustment or a feed movement.

According to an advantageous further development of the invention, the spindles are constructed as vertical spindles. The advantages gained from dispensing with a loading system and from the improved disposal of chips can accordingly be made use of by applying the pick-up method. The arrangement of the spindles at any optional angle to the extent of a horizontal arrangement is therefore not excluded.

If required, the spindles can serve to receive workpieces, each optional tool carrier being arranged on the machine base body in this case, or to receive tools, in which case every optional workpiece carrier is arranged on the machine base body.

The invention will be explained more fully in the following with reference to an embodiment example shown in the drawing.

DESCRIPTION OF THE PREFERRED EMBODIMENTS

Figure 1:
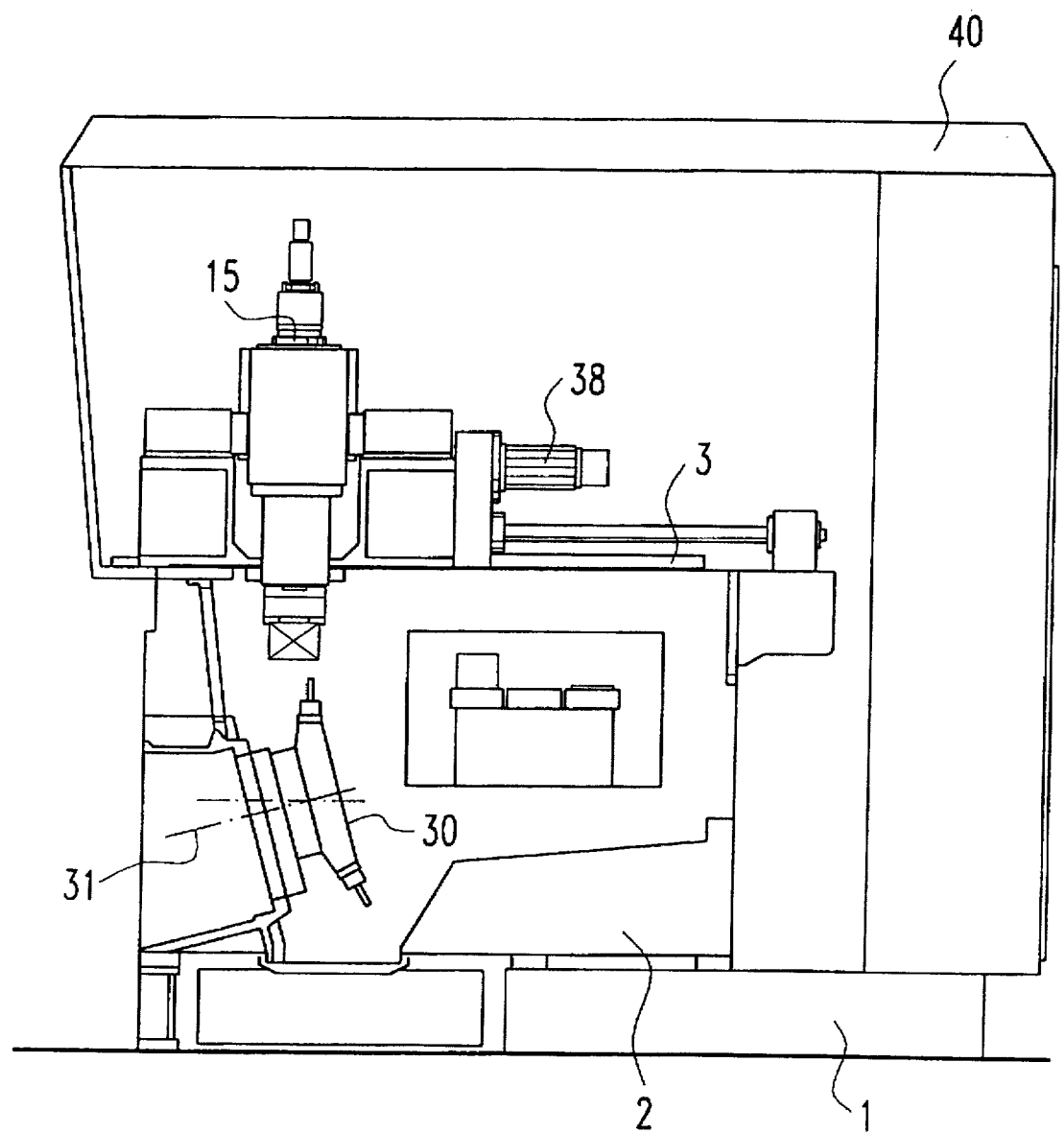
FIG. 1 is a side view of a machine tool.
Figure 2:
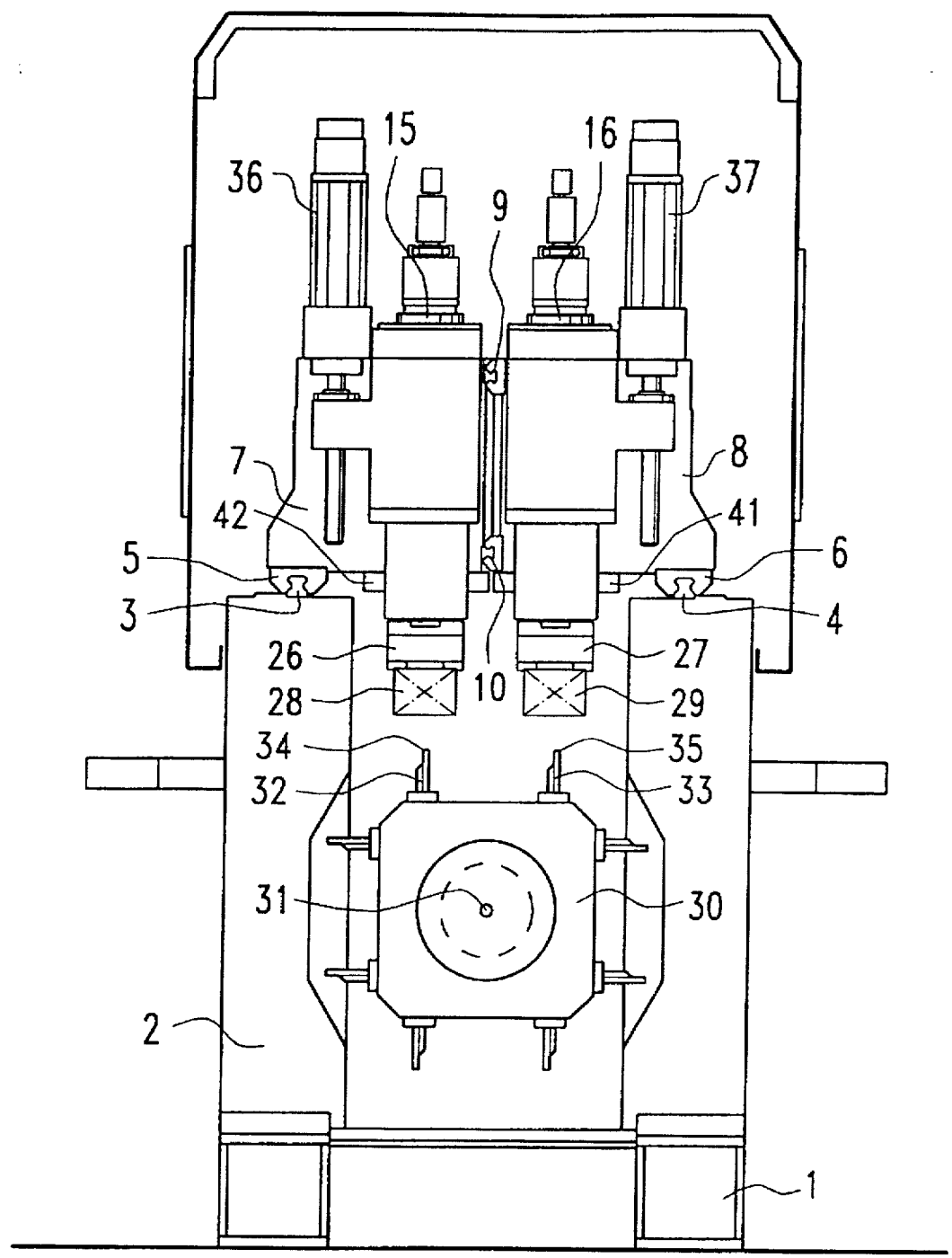
FIG. 2 is a front view of the machine tool according to FIG. 1.
Figure 3:
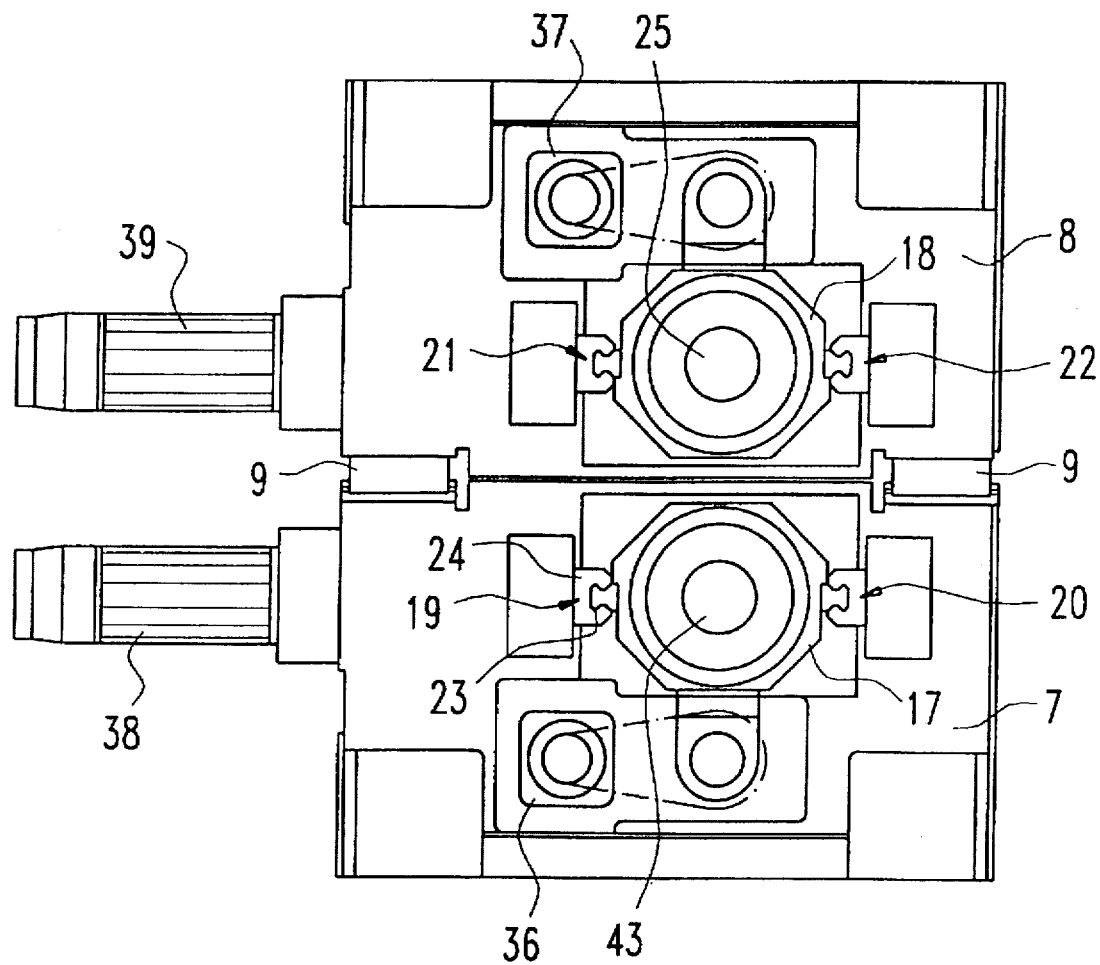
FIG. 3 is a top view of this machine tool.
Figure 4:
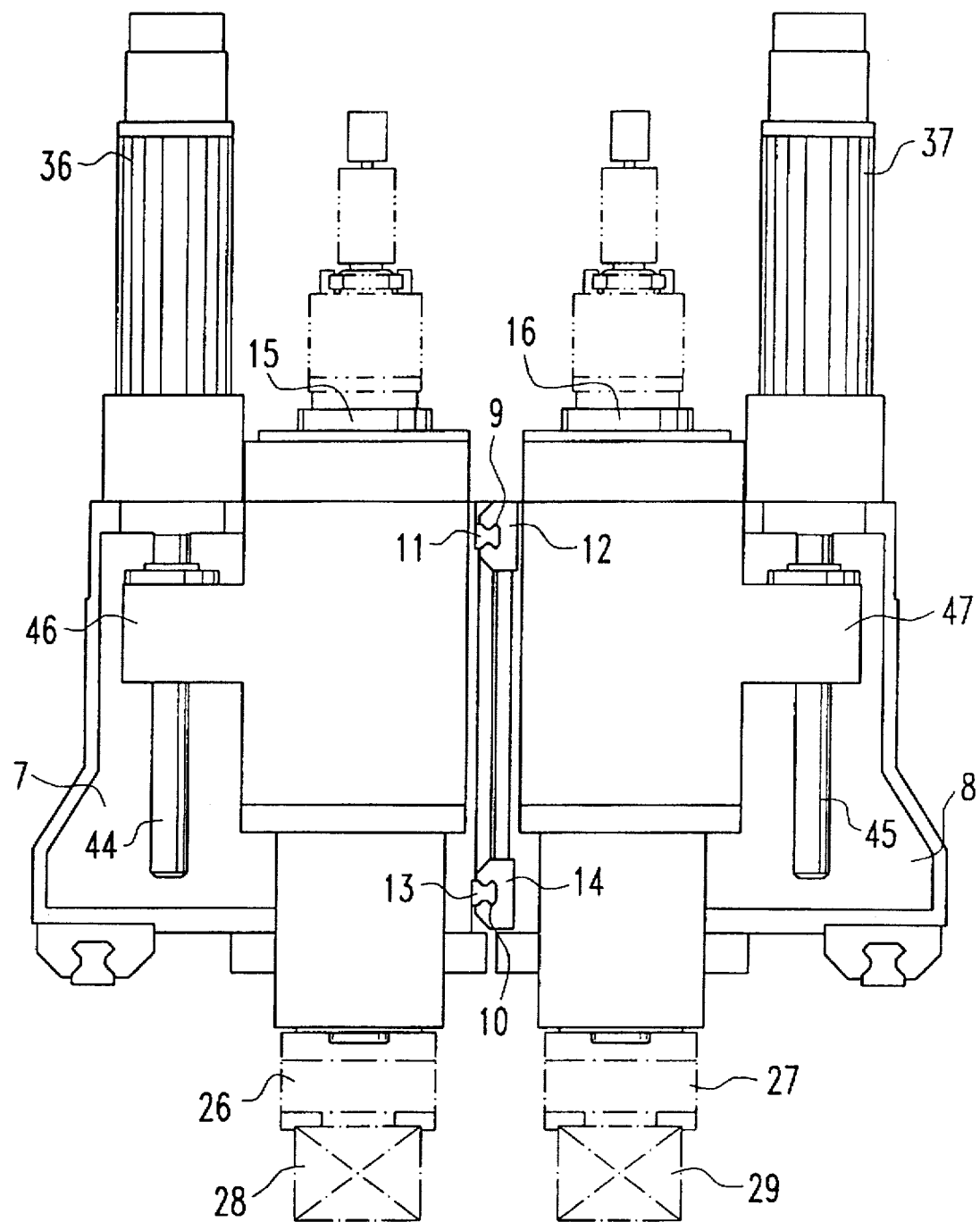
FIG. 4 is a front view of the slide arrangement.

As will be seen from FIGS. 1 to 3, a machine base body 2 and a container 40, designated hereinafter as power container, which receives the various control elements and the power supply, are placed on a base frame 1. This power container comprises a fully installed control box from which prefabricated connections lead out to the consumers. Two linear guides 3 and 4 are provided on the upper side of the machine base body 2, a combined slide formed of two partial slides 7 and 8 being arranged thereon so as to be movable in the X direction by means of guide carriages 5 and 6. The two partial slides 7 and 8 are supported relative to one another by support guides 9 and 10, a total of four portions of which are provided at the greatest possible horizontal and vertical distance. As will be seen from FIG. 4, each portion of a support guide has a linear guide 11 and a guide carriage 12 in its upper region and a linear guide 13 and a guide carriage 14 in its lower region, the linear guides being provided at partial slide 7 and the guide carriages being provided at partial slide 8. Every partial slide 7 and 8 supports a vertical spindle, designated in its entirety by 15 and 16, respectively, these vertical spindles 15 and 16 being guided by their spindle housing 17 and 18, respectively, in the upper region by vertical guides 19, 20 and 21, 22 and in the lower region by hydrostatic guides 42 and 41 so as to be displaceable in the Z direction. Like the guides described above, the guides 19 to 22 are constructed as a linear guide 23 with associated guide carriage 24 as is shown in the guide arrangement 19. The spindles 15 and 16 are designed as so-called motor spindles having a stator which is arranged so as to be stationary in the spindle housing 17 and 18, respectively, and a rotor which is arranged directly on the spindle shaft 43 and 25, respectively. The spindle shafts 43 and 25 have clamping chucks 26 and 27 at their lower ends for grasping workpieces 28 and 29. A joint tool turret 30 which is supported so as to be rotatable about an axis 31, can be driven in the rotating direction, and can be outfitted with a total of 4 pairs of tools, of which only the upper tools which are identical to one another are provided with reference numbers 32 and 33 in FIG. 2, is arranged below the spindles 15 and 16 which are arranged close together. It is also possible to provide 8 pairs of tools. These tools serve for the simultaneous machining of workpieces 28 and 29 with their cutting edges 34 and 35 in the position shown in the drawing.

In order to carry out this simultaneous machining, the spindles with their clamped-in workpieces must be capable of being adjusted exactly to the tool cutting edges 34 and 35 in the Z direction as well as in the X direction. For this purpose, every motor spindle 15 and 16 has its own drive 36 and 37 with ball-roller spindles 44 and 45 and nuts 46 and 47 for displacement in the Z direction. Every partial slide 7 and 8 is likewise provided with its own drive 38 and 39. The drives 36 and 37 and drives 38 and 39 can be controlled by a control with a GANTRY function, which is known per se and is therefore not shown, in such a way that, in the case of drives 36 and 37, they can displace the vertical spindles either jointly and synchronously or, in order to carry out a correcting movement, relative to one another in the Z direction. In the case of drives 38 and 39, the control device is so designed that the two partial slides 7 and 8 can either be displaced jointly and synchronously or, in order to carry out a correcting adjustment, relative to one another in the X direction. As a result of this possibility for corrective adjustment in both the X and Z directions, it is possible, in spite of dimensional tolerances and varying degrees of wear of the tool cutting edges, to adjust the spindles in the X direction and in the Z direction in such a way that the workpieces 28 and 29 have identical adjustments with respect to the tool cutting edges 34 and 35 so that both workpieces 28 and 29 can be machined in a completely synchronized manner.

The GANTRY function ensures the movement of two or more axes in a synchronous manner with respect to path and/or angle. The respective tool corrections are accounted for via an offset, i.e., a path offset and/or angular offset, between the axes to be synchronized. Each time a new tool is swung into the working position, the correction values associated with the tool in directions X and Z must be assigned to the respective partial slides as an offset, whereupon the partial slides operate in an absolutely synchronous manner.

The workpiece which is held in a spindle and machined on one side can also be transferred to the adjacent spindle by means of a transferring and turning device, not shown in the drawing, so that the workpiece can be machined on the side which was previously clamped in. In this type of varying machining, the individual spindles are moved asynchronously in the X and Z directions in order to carry out the necessary different machining processes. Of course, separate machining can also be carried out from the outset without transferring from the adjacent spindle.

While the foregoing description and drawings represent the preferred embodiments of the present invention, it will be obvious to those skilled in the art that various changes and modifications may be made therein without departing from the true spirit and scope of the present invention.

What is claimed is:

1. A machine tool comprising:
    a machine base body;
    a plurality of spindles for the simultaneous or varying, separate machining of a plurality of workpieces;

two partial slides each for receiving at least one spindle, which spindles are drivable about their rotational axes and movable in their axial direction, said partial slides being supported directly on an interface relative to one another, said interface allowing said partial slides to be moved jointly or relative to one another in a direction perpendicular to a movement direction of the spindles, and which partial slides form a combined slide; and wherein only the combined slide is configured to be guided by a guide arrangement on the machine base body.

2. The machine tool according to claim 1, wherein said guide arrangement for said combined slide has two linear guides and associated guide carriages and said partial slides are supported relative to one another by means of support guides which are arranged at a distance from one another in the vertical direction.

3. The machine tool according to claim 1, wherein said guide arrangement for the combined slide comprises two linear guides which are associated in each instance with remote outer sides of the combined slide and guide carriages which are arranged at the combined slide and associated with the linear guides.

4. The machine tool according to claim 2, wherein said support guides have two linear guides and guide carriages associated with the latter.

5. The machine tool according to claim 1, wherein a separate driving unit is associated with each partial slide, these separate driving units being controllable jointly and synchronously or independently from one another via a control unit.

6. The machine tool according to claim 1, wherein relative displacement of the partial slides for corrective adjustment is effected as a function of dimensional deviation between the spindle axes and associated tool cutting edges which is determined by a measurement system.

7. The machine tool according to claim 1, wherein the spindles are constructed as motor spindles in which the rotor is arranged directly on the spindle shaft and the stator is arranged in the spindle housing, and wherein each spindle has its own drive for movement in the direction of its axis, wherein a control device is provided which enables a joint synchronous movement of both spindles or a relative displacement for carrying out a correcting adjustment or a feed movement.

8. The machine tool according to claim 1, wherein the spindles are constructed as vertical spindles.

9. The machine tool according to claim 1, wherein the spindles serve to receive workpieces.

10. The machine tool according to claim 1, wherein the spindles serve to receive tools.

11. The machine tool according to claim 9, wherein at least one tool carrier is arranged on the machine base body.

12. The machine tool according to claim 11, wherein a joint tool carrier which is designed as a multiple turret is associated with all spindles.

13. The machine tool according to claim 10, wherein at least one workpiece carrier is arranged on the machine base body.

* * * * *